United States Patent
Hirata

(10) Patent No.: US 7,843,675 B2
(45) Date of Patent: Nov. 30, 2010

(54) OVERCURRENT PROTECTION CIRCUIT, LOAD DRIVING DEVICE, MOTOR DRIVING DEVICE, ELECTRIC APPLIANCE, POWER SUPPLY DEVICE

(75) Inventor: Shigeru Hirata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 297 days.

(21) Appl. No.: 12/063,891

(22) PCT Filed: Aug. 25, 2006

(86) PCT No.: PCT/JP2006/316677

§ 371 (c)(1),
(2), (4) Date: Feb. 15, 2008

(87) PCT Pub. No.: WO2007/029517

PCT Pub. Date: Mar. 15, 2007

(65) Prior Publication Data

US 2009/0135531 A1     May 28, 2009

(30) Foreign Application Priority Data

Sep. 6, 2005    (JP)  .............................. 2005-257284

(51) Int. Cl.
*H02H 9/00*     (2006.01)
(52) U.S. Cl. ..................... 361/93.1; 361/18; 361/93.5
(58) Field of Classification Search ............... 361/59, 361/93.1, 18, 93.5; 363/21.02; 327/392
See application file for complete search history.

(56) References Cited

U.S. PATENT DOCUMENTS

| | | | |
|---|---|---|---|
| 4,584,494 A * | 4/1986 | Arakawa et al. | ............ 327/392 |
| 5,894,394 A | 4/1999 | Baba et al. | |
| 6,194,869 B1 * | 2/2001 | Peterzell | ...................... 320/134 |
| 6,515,840 B2 * | 2/2003 | Covi et al. | .................. 361/93.1 |
| 2007/0165426 A1 * | 7/2007 | Kyono | ...................... 363/21.02 |
| 2007/0241725 A1 * | 10/2007 | Ryu et al. | .................... 323/222 |
| 2008/0043391 A1 * | 2/2008 | Wong et al. | .................... 361/59 |

FOREIGN PATENT DOCUMENTS

| | | |
|---|---|---|
| JP | 64-019914 | 1/1989 |
| JP | 09-308078 | 11/1997 |
| JP | 09-308261 | 11/1997 |
| JP | 09-331625 | 12/1997 |
| JP | 2001-145339 | 5/2001 |
| JP | 3665565 | 4/2005 |

* cited by examiner

*Primary Examiner*—Jared J Fureman
*Assistant Examiner*—Angela Brooks
(74) *Attorney, Agent, or Firm*—Fish & Richardson P.C.

(57) ABSTRACT

In an overcurrent protection circuit 23 according to the present invention, a timer circuit TMR that generates an overcurrent protection signal EN according to the results of comparison between a detection voltage Va (Vb) and VrefL and VrefH is configured as follows. When Va (Vb) has reached VrefL, the timer circuit TMR starts to count T1. When T1 has elapsed with Va (Vb) kept above VrefL, the timer circuit TMR changes EN to a disabled state and starts to count T2. When T2 has elapsed, the timer circuit TMR returns EN to an enabled state. On the other hand, after Va (Vb) has reached VrefL and T1 starts to be counted, when Va (Vb) has reached VrefH, the timer circuit TMR forcibly stops the counting of T1 without waiting for T1 to elapse, changes EN to a disabled state, and starts to count T2. With this configuration, it is possible to offer necessary and sufficient protection for an object to be protected (for example, a load or an element provided inside a device).

7 Claims, 7 Drawing Sheets

FIG.5

| | (a) | (b) | (c) | (d) |
|---|---|---|---|---|
| FIN | H | L | H | L |
| RIN | L | H | H | L |
| QH1 | ON | OFF | OFF | OFF |
| QH2 | OFF | ON | OFF | OFF |
| QL1 | ON | ON | ON | OFF |
| QL2 | ON | OFF | ON | OFF |
| MODE | (a) FORWARD ROTATION | (b) REVERSE ROTATION | (c) BRAKING | (d) IDLE RUNNING |

(a) FORWARD ROTATION (b) REVERSE ROTATION (c) BRAKING (d) IDLE RUNNING

OVERCURRENT PROTECTION CIRCUIT, LOAD DRIVING DEVICE, MOTOR DRIVING DEVICE, ELECTRIC APPLIANCE, POWER SUPPLY DEVICE

TECHNICAL FIELD

The present invention relates to a load driving device such as a motor driving device or the like and a power supply device, and more particularly to an overcurrent protection circuit provided therein.

BACKGROUND ART

Conventionally, many load driving devices such as motor driving devices or the like and power supply devices incorporate various protection circuits (such as an overcurrent protection circuit, an overvoltage protection circuit, and an overheating protection circuit) to enhance the safety thereof.

Of these protection circuits, a conventional overcurrent protection circuit is in general configured as follows. The conventional overcurrent protection circuit monitors a drive current flowing through an object to be protected (for example, a load or an element provided inside the device). When the drive current has reached a predetermined threshold value and remains in that state for a predetermined time (a noise masking time), the conventional overcurrent protection circuit judges that an overcurrent occurs in the device, and shuts down the operation of the device.

As a conventional technology related to what has been described thus far, an intelligent power switch that provides a comparator with a first threshold value corresponding to a high current that can, if it flows even for a short time, damage a semiconductor switch, that stores in a memory a second threshold value that is smaller than the first threshold value, and, when a detected current value becomes equal to or greater than the first threshold value or the CPU judges that a current greater than the second threshold value is continuously flowing for more than a given period of time, that turns the semiconductor switch off, and a switching device are disclosed and proposed in Patent Document 1.

Patent Document 2 discloses and proposes a switching power supply device that is composed of a fuse, a primary winding of a transformer, a switch element, and a current detection resistor connected in series between a direct-current voltage input terminal and a ground terminal, that makes a control circuit portion perform on/off control of the switch element so as to keep constant an output voltage of a rectifying/smoothing circuit connected to a secondary winding of the transformer, and that performs protection operation when a current detection voltage detected by the current detection resistor exceeds a predetermined threshold value, wherein a protection diode that, when the switch element is short-circuited, makes the fuse blow by passing a high current therethrough by being short circuited upon the application of a voltage exceeding its withstand voltage in the reverse direction is connected in parallel with the current detection resistor so as to be opposite in polarity.

Patent Document 3 discloses and proposes a semiconductor integrated circuit that performs switching control of an operation mode of an H-bridge circuit according to a load current, and a motor driving control system.

Patent Document 1: JP-A-09-331625

Patent Document 2: JP-A-2001-145339

Patent Document 3: JP-B-3665565

DISCLOSURE OF THE INVENTION

Problems to be Solved by the Invention

It is true that the conventional overcurrent protection circuit described above makes it possible to reduce the risk of breakdown of an object to be protected (for example, a load or an element provided inside the device) because it can shut down the operation of the device when an overcurrent occurs.

Furthermore, the conventional overcurrent protection circuit described above has an advantage that instantaneous noise or the like rarely causes it to malfunction because it is so configured as to judge that an overcurrent occurs in the device only when a drive current equal to or greater than a predetermined threshold value flows for a predetermined time.

However, in the conventional overcurrent protection circuit described above, even when a drive current to be monitored greatly exceeds a predetermined threshold value, such as when the impedance component of a load is small or an output terminal connected to the load and a power supply voltage or a ground are short-circuited, it is not judged that an overcurrent occurs unless a predetermined time that is set for noise masking has elapsed, and therefore the device is not shut down. As a result, in the conventional overcurrent protection circuit described above, an excessive current continuously flows through an object to be protected (for example, a load or an element provided inside the device) until the above-described predetermined time has elapsed. This may cause the object to be protected to exceed its safe operating area, resulting in breakdown thereof.

Although the conventional technology disclosed in Patent Document 1 can solve the problems described above, it requires a CPU and a memory to realize overcurrent protection operation. This leads to an undesirable increase in the device size and in its cost.

The conventional technology disclosed in Patent Document 2 can also solve the problems described above. However, in this conventional technology, the device is shut down by causing a fuse blowout. This makes it impossible to make an attempt to automatically restore the device once it is shut down.

On the other hand, the conventional technology disclosed in Patent Document 3 performs switching control of an operation mode of an H-bridge circuit according to a load current, aiming at reducing the amount of noise by reducing the load current ripple, and therefore it cannot solve the problems described above.

In view of the conventionally experienced problems described above, it is an object of the present invention to provide an overcurrent protection circuit that can offer necessary and sufficient protection for an object to be protected (for example, a load or an element provided inside a device).

Means for Solving the Problem

To achieve the above object, according to the present invention, an overcurrent protection circuit is provided with: a sense resistor that generates a detection voltage corresponding to a current flowing through an object to be protected; a first comparator that compares the detection voltage with a first threshold voltage; a second comparator that compares the detection voltage with a second threshold voltage that is higher than the first threshold voltage; and a timer circuit that generates an overcurrent protection signal according to comparison output signals of the first and second comparators. Here, the timer circuit starts to count a first threshold time when the detection voltage has reached the first threshold voltage. When the first threshold time has elapsed with the detection voltage kept above the first threshold voltage, the timer circuit changes the overcurrent protection signal to a disabled state and starts to count a second threshold time. When the second threshold time has elapsed, the timer circuit returns the overcurrent protection signal to an enabled state. After the detection voltage has reached the first threshold voltage and the first threshold time starts to be counted, when the detection voltage has reached the second threshold voltage, the timer circuit forcibly stops the counting of the first threshold time without waiting for the first threshold time to elapse, changes the overcurrent protection signal to a disabled state, and starts to count the second threshold time (first configuration).

Preferably, in the overcurrent protection circuit having the first configuration described above, the timer circuit includes a capacitor having one end from which a charging voltage is extracted, a first constant-current source that is a means for charging the capacitor, a second constant-current source that is a means for discharging the capacitor, a first switch that switches charging/discharging of the capacitor according to the comparison output signal of the first comparator and the overcurrent protection signal, a second switch that connects/disconnects the one end of the capacitor to/from a power supply line according to the comparison output signal of the second comparator and the overcurrent protection signal, a third comparator whose output logic is changed depending on whether the charging voltage is higher or lower than a predetermined lower-limit set voltage, a fourth comparator whose output logic is changed depending on whether the charging voltage is higher or lower than a predetermined upper-limit set voltage, and an RS flip-flop to which the comparison output signals of the third and fourth comparators are inputted, and from which an output signal thereof is extracted as the overcurrent protection signal. Here, the first switch is so controlled as to charge the capacitor by the first constant-current source when the detection voltage has reached the first threshold voltage, and discharge the capacitor by the second constant-current source when the detection voltage has not reached the first threshold voltage or the overcurrent protection signal is changed to a disabled state. The second switch is so controlled as to connect the one end of the capacitor to the power supply line when the detection voltage has reached the second threshold voltage, and disconnect the one end of the capacitor from the power supply line when the detection voltage has not reached the second threshold voltage or the overcurrent protection signal is changed to a disabled state (second configuration).

Preferably, in the overcurrent protection circuit having the first or second configuration described above, more than one group of the sense resistor and the first and second comparators is provided on a current path of the object to be protected (third configuration).

According to the present invention, a load driving device is provided with: an output circuit having an output switch element connected to a load; a control circuit that feeds a drive current to the load according to opening/closing control of the output switch element; and an overcurrent protection circuit that generates an overcurrent protection signal by monitoring the drive current. Here, the load driving device is provided with, as the overcurrent protection circuit, an overcurrent protection circuit having one of the first to third configurations described above, and the control circuit is so configured that the opening/closing control of the output switch element is prohibited when the overcurrent protection signal is in a disabled state (fourth configuration).

According to the present invention, a motor driving device is a motor driving device that controls the driving of a motor, and is provided with a load driving device having the fourth configuration described above as a means for feeding a drive current to a motor coil that forms the motor (fifth configuration).

According to the present invention, an electric appliance is provided with a motor and a motor driving device that controls the driving of the motor. Here, the electric appliance is provided with, as the motor driving device, a motor driving device having the fifth configuration described above (sixth configuration).

According to the present invention, a power supply device is provided with: an output circuit having an output switch element connected between input and output terminals; a control circuit that generates a desired output voltage from an input voltage according to opening/closing control of the output switch element; and an overcurrent protection circuit that generates an overcurrent protection signal by monitoring a current flowing through the output switch element. Here, the power supply device is provided with, as the overcurrent protection circuit, an overcurrent protection circuit having one of the first to third configurations, and the control circuit is so configured that the opening/closing control of the output switch element is prohibited when the overcurrent protection signal is in a disabled state (seventh configuration).

EFFECT OF THE INVENTION

According to the present invention, it is possible to determine the urgency of the need for protection operation according to a current value of an object to be monitored, and to offer necessary and sufficient protection for the object to be protected based on the determination result.

BRIEF DESCRIPTION OF DRAWINGS

FIG. 5 A diagram illustrating gate signal generating operation performed according to operation mode control signals FIN and RIN.

LIST OF REFERENCE SYMBOLS

1 Motor
2 Motor driving device
3 Power supply device
21, 31 H-bridge circuit, Output circuit
22, 32 Control circuit
23, 33 Overcurrent protection circuit
QH1, QH2 P-channel field-effect transistor (upper switch element)
QL1, QL2 N-channel field-effect transistor (lower switch element)

DH1, DH2, DL1, DL2 Diode
L Motor coil
Ra, Rb Sense resistor
CMP1a, CMP1b First comparator
CMP2a, CMP2b Second comparator
OR1 First OR circuit
OR2 Second OR circuit
TMR Timer circuit
C1 Capacitor
I1 First constant-current source
I2 Second constant-current source
SW1 First switch
SW2 Second switch
CMP3 Third comparator
CMP4 Fourth comparator
E1 First direct-current voltage source
E2 Second direct-current voltage source
FF RS flip-flop
Lex Coil
Cex Capacitor

BEST MODE FOR CARRYING OUT THE INVENTION

Figure 1:
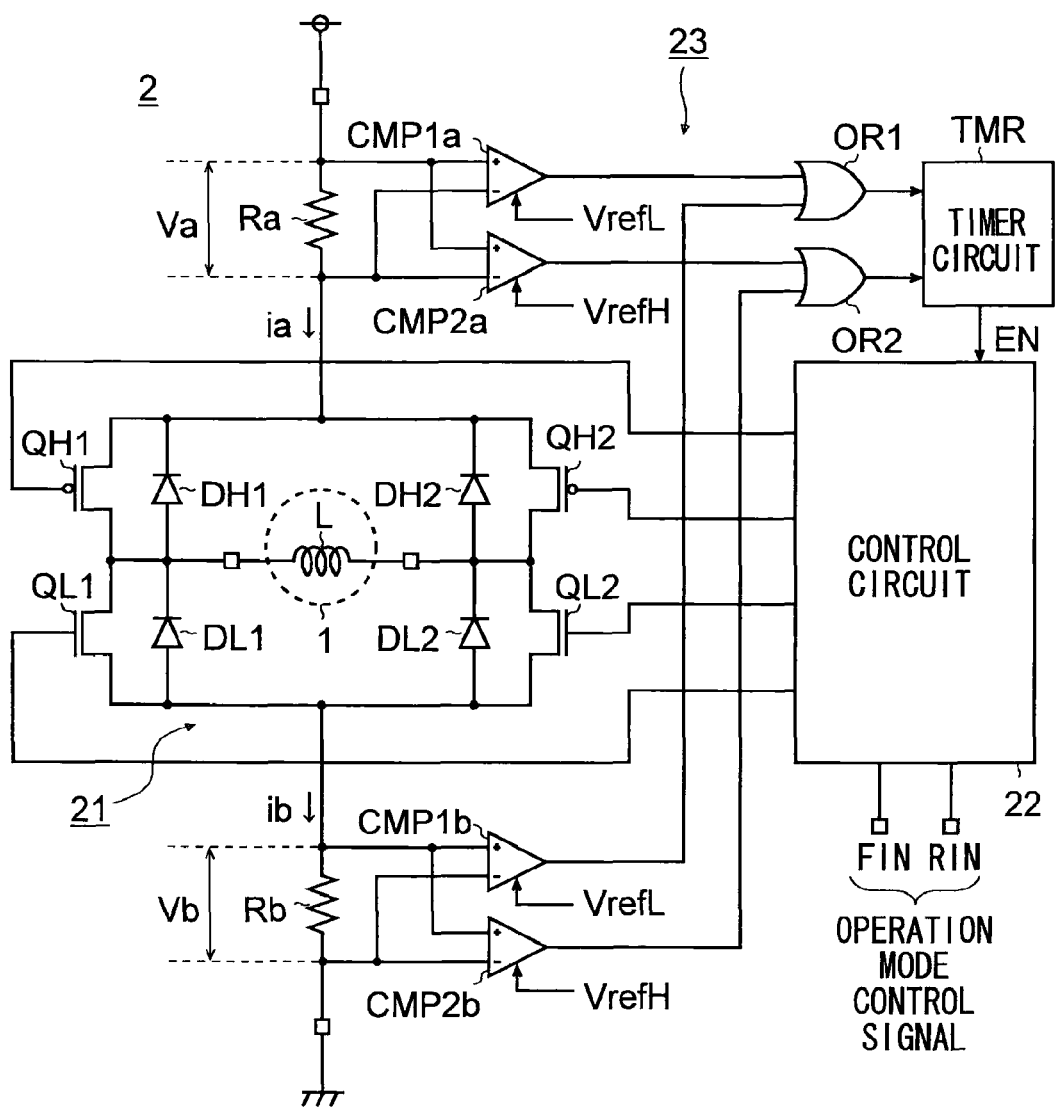
FIG. 1 A block diagram showing one embodiment of an electric appliance provided with the motor driving device of the present invention.

FIG. 1 is a block diagram (partially including a circuit element) showing one embodiment of an electric appliance provided with the motor driving device of the present invention.

As shown in this figure, the electric appliance of this embodiment is composed of a motor 1 and a motor driving device 2 that controls the driving of the motor 1.

The motor 1 is a single-phase DC motor that rotates in a direction corresponding to a drive current passing through a motor coil L, and four operation modes thereof (forward rotation, reverse rotation, braking, and idle running) are switched by the motor driving device 2.

Examples of mechanisms of an electric appliance provided with such a motor 1 capable of rotating in a reverse direction are a tray opening/closing mechanism, a cassette ejecting mechanism of a video cassette recorder, an automatic paper cutting mechanism of a printer, a focus mechanism of a camera, and a louver opening/closing mechanism of an air conditioner. As just described, the motor 1 can be installed into an extremely wide range of products.

The motor driving device 2 is composed, as a means for feeding a drive current to the motor coil L that forms the motor 1, of a load driving device built with an H-bridge circuit 21, a control circuit 22, and an overcurrent protection circuit 23.

The H-bridge circuit 21 is built with four switch elements (P-channel field-effect transistors QH1 and QH2 and N-channel field-effect transistors QL1 and QL2) connected in the shape of an H bridge with respect to the motor coil L (a reactance load) that forms the motor 1.

The internal configuration of the H-bridge circuit 21 will be described in detail.

The sources of the transistors QH1 and QH2, which are upper switch elements, are both connected to a power supply input terminal to which a power supply voltage Vcc is applied. The sources of the transistors QL1 and QL2, which are lower switch elements, are both connected to a ground terminal. The drains of the transistors QH1 and QL1 are connected together at a node, and the node is connected to a first output terminal to which one end of the motor coil L is connected. The drains of the transistors QH2 and QL2 are connected together at a node, and the node is connected to a second output terminal to which the other end of the motor coil L is connected. The gates of the transistors QH1, QH2, QL1, and QL2 are connected to the respective gate signal output terminals of the control circuit 22.

As shown in FIG. 1, diodes DH1, DH2, DL1, and DL2 are connected in parallel to the transistors QH1, QH2, QL1, and QL2, respectively, so as to face in the direction shown in the figure, and function as back electromotive force absorbing elements for the motor coil L. In a case where parasitic diodes are attached to the transistors QH1, QH2, QL1, and QL2, such parasitic diodes may be used as the back electromotive force absorbing elements.

The control circuit 22 is a main body responsible for controlling the transistors QH1, QH2, QL1, and QL2, and is a means for generating gate signals of the transistors QH1, QH2, QL1, and QL2 so as to select a transistor to be turned on according to operation mode control signals FIN and RIN inputted from the outside of the device. The control circuit 22 is so configured that opening/closing control of the transistors is permitted when an overcurrent protection signal EN inputted from the overcurrent protection circuit 23 is in an enabled state, and opening/closing control of the transistors is prohibited when the overcurrent protection signal EN is in a disabled state. Note that control performed by the control circuit 22 for switching an operation mode of the motor 1 will be described later in detail.

The overcurrent protection circuit 23 is a means for monitoring drive currents ia and ib flowing through an object to be protected (the transistors of the H-bridge circuit 21, or the motor coil L) and generating an overcurrent protection signal EN.

The internal configuration of the overcurrent protection circuit 23 will be described in detail.

As shown in FIG. 1, the overcurrent protection circuit 23 is built with sense resistors Ra and Rb, first comparators CMP1a and CMP1b, second comparators CMP2a and CMP2b, a first OR circuit OR1, a second OR circuit OR2, and a timer circuit TMR.

The sense resistor Ra is connected between a power supply terminal and the H-bridge circuit 21 and generates a detection voltage (a voltage across the sense resistor Ra) Va according to the drive current ia flowing through this current path, and the sense resistor Rb is connected between the H-bridge circuit 21 and the ground terminal and generates a detection voltage (a voltage across the sense resistor Rb) Vb according to the drive current ib flowing through this current path.

The first comparators CMP1a and CMP1b are each a comparing means whose output logic is changed depending on whether corresponding one of the detection voltages Va and Vb is higher or lower than a first threshold voltage VrefL. Note that comparison output signals of the first comparators CMP1a and CMP1b are each a binary signal that takes a high level when corresponding one of the detection voltages Va and Vb is higher than the first threshold voltage VrefL and takes a low level when corresponding one of the detection voltages Va and Vb is lower than the first threshold voltage VrefL.

The second comparators CMP2a and CMP2b are each a comparing means whose output logic is changed depending on whether corresponding one of the detection voltages Va and Vb is higher or lower than a second threshold voltage VrefH that is higher than the first threshold voltage VrefL. Note that comparison output signals of the second comparators CMP2a and CMP2b are each a binary signal that takes a high level when corresponding one of the detection voltages Va and Vb is higher than the second threshold voltage VrefH and takes a low level when corresponding one of the detection voltages Va and Vb is lower than the second threshold voltage VrefH.

The first and second threshold voltages VrefL and VrefH described above are both set within a safe operating area of the transistors that form the H-bridge circuit 21.

The first OR circuit OR1 is a means for taking the OR of the comparison output signals of the first comparators CMP1a and CMP1b and sending an operation result signal thus obtained (hereinafter referred to as a first OR signal) to the timer circuit TMR.

The second OR circuit OR2 is a means for taking the OR of the comparison output signals of the second comparators CMP2a and CMP2b and sending an operation result signal thus obtained (hereinafter referred to as a second OR signal) to the timer circuit TMR.

The timer circuit TMR is a means for generating an overcurrent protection signal EN according to the first and second OR signals (i.e. the comparison output signals of the first and second comparators). The configuration and operation of the timer circuit TMR will be described later in detail.

As described above, in the overcurrent protection circuit 23 of this embodiment, more than one group (in this embodiment, two groups) of drive current detecting means (a sense resistor and first and second comparators) is provided on the current path of the H-bridge circuit 21 to be protected. With this configuration, it is possible to improve the accuracy of drive current detection. Moreover, with a configuration in which, like this embodiment, the drive current detecting means are provided both on a power supply terminal side and on a ground terminal side of the H-bridge circuit 21, it is possible to appropriately detect an overcurrent that occurs when an output terminal connected to the motor coil L and a power supply voltage or a ground are short-circuited. It is to be noted that the number of groups of drive current detecting means does not necessarily have to be more than one.

Next, the specific internal configuration of the timer circuit TMR described above will be described in detail with reference to FIG. 2.

Figure 2:
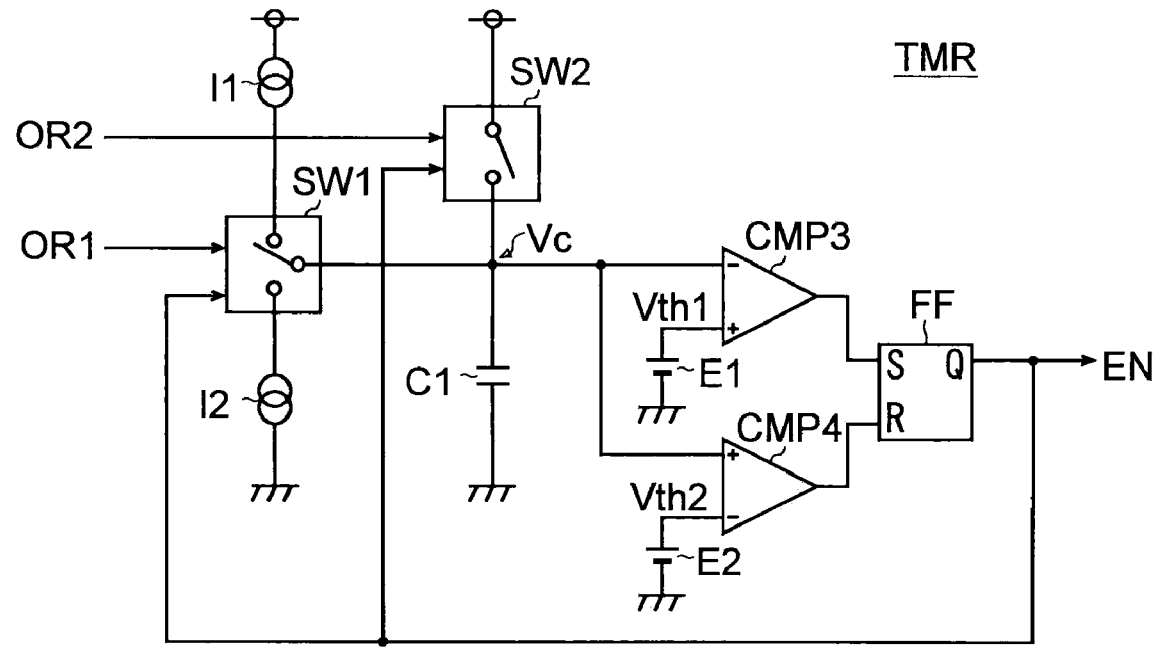
FIG. 2 A block diagram showing an example of the configuration of a timer circuit TMR.

FIG. 2 is a block diagram showing an example of the configuration of the timer circuit TMR.

As shown in FIG. 2, the timer circuit TMR of this embodiment is built with a capacitor C1, a first constant-current source I1, a second constant-current source I2, a first switch SW1, a second switch SW2, a first direct-current voltage source E1, a second direct-current voltage source E2, a third comparator CMP3, a fourth comparator CMP4, and an RS flip-flop FF.

One end of the capacitor C1 is connected to a common terminal of the first switch SW1, to one end of the second switch SW2, to the inverting input terminal (−) of the third comparator CMP3, and to the non-inverting input terminal (+) of the fourth comparator CMP4, and, from this one end, a charging voltage Vc is extracted. The other end of the capacitor C1 is grounded.

The first constant-current source I1 is a means for charging the capacitor C1. One end of the first constant-current source I1 is connected to the power supply terminal, and the other end thereof is connected to a first switch terminal of the first switch SW1.

The second constant-current source I2 is a means for discharging the capacitor C1. One end of the second constant-current source I2 is connected to a second switch terminal of the first switch SW1, and the other end thereof is grounded.

The first switch SW1 is a means for switching charging/discharging of the capacitor C1 according to the first OR signal (i.e. the comparison output signals of the first comparators CMP1a and CMP1b) and the overcurrent protection signal EN.

More specifically, when the first OR signal takes a high level (that is, one of the detection voltages Va and Vb has reached the first threshold voltage VrefL), the first switch SW1 of this embodiment is so controlled as to connect the common terminal thereof to the first switch terminal, so that the capacitor C1 is charged by the first constant-current source I1. On the other hand, when the first OR signal takes a low level (that is, neither the detection voltage Va nor Vb has reached the first threshold voltage VrefL) or the overcurrent protection signal EN is changed to a disabled state (in this embodiment, a low level), the first switch SW1 is so controlled as to connect the common terminal thereof to the second switch terminal, so that the capacitor C1 is discharged by the second constant-current source I2.

The second switch SW2 is a means for connecting/disconnecting one end of the capacitor C1 to/from the power supply line according to the second OR signal (i.e. the comparison output signals of the second comparators CMP2a and CMP2b) and the overcurrent protection signal EN.

More specifically, when the second OR signal takes a high level (that is, one of the detection voltages Va and Vb has reached the second threshold voltage VrefH), the second switch SW2 of this embodiment is switched to an on state so as to connect the one end of the capacitor C1 to the power supply line. On the other hand, when the second OR signal takes a low level (that is, neither the detection voltage Va nor Vb has reached the second threshold voltage VrefH) or the overcurrent protection signal EN is changed to a disabled state (in this embodiment, a low level), the second switch SW2 is switched to an off state so as to disconnect the one end of the capacitor C1 from the power supply line.

The first direct-current voltage source E1 is a means for generating a lower-limit set voltage Vth1 of the charging voltage Vc, and a positive terminal thereof is connected to the non-inverting input terminal (+) of the third comparator CMP3; a negative terminal thereof is grounded. In a case where the lower-limit set voltage Vth1 is set to zero, the first direct-current voltage source E1 becomes unnecessary, and the non-inverting input terminal (+) of the third comparator CMP3 simply has to be grounded.

The second direct-current voltage source E2 is a means for generating an upper-limit set voltage Vth2 (>Vth1) of the charging voltage Vc, and a positive terminal thereof is connected to the inverting input terminal (−) of the fourth comparator CMP4; a negative terminal thereof is grounded.

The third comparator CMP3 is a comparing means whose output logic is changed depending on whether the lower-limit set voltage Vth1 is higher or lower than the charging voltage Vc. Note that a comparison output signal of the third comparator CMP1 is a binary signal that takes a high level when the lower-limit set voltage Vth1 is higher than the charging voltage Vc and takes a low level when the lower-limit set voltage Vth1 is lower than the charging voltage Vc.

The fourth comparator CMP4 is a comparing means whose output logic is changed depending on whether the charging voltage Vc is higher or lower than the upper-limit set voltage Vth2. Note that a comparison output signal of the fourth comparator CMP4 is a binary signal that takes a high level when the charging voltage Vc is higher than the upper-limit set voltage Vth2 and takes low level when the charging voltage Vc is lower than the upper-limit set voltage Vth2.

The RS flip-flop FF is a means for sending an overcurrent protection signal EN from the output terminal (Q) thereof based on the comparison output signal of the third comparator CMP3 inputted to the set terminal (S) thereof and the comparison output signal of the fourth comparator CMP4 inputted to the reset terminal (R) thereof. More specifically, the output logic of the RS flip-flop FF repeats a logic level change in such a way that it takes a low level (a disabled state) when the charging voltage Vc has reached the upper-limit set voltage Vth2, and is returned to a high level (an enabled state) when the charging voltage Vc has reached the lower-limit set voltage Vth1.

Next, operation of the timer circuit TMR configured as described above will be described in detail with reference to FIGS. 3 and 4.

Figure 3:
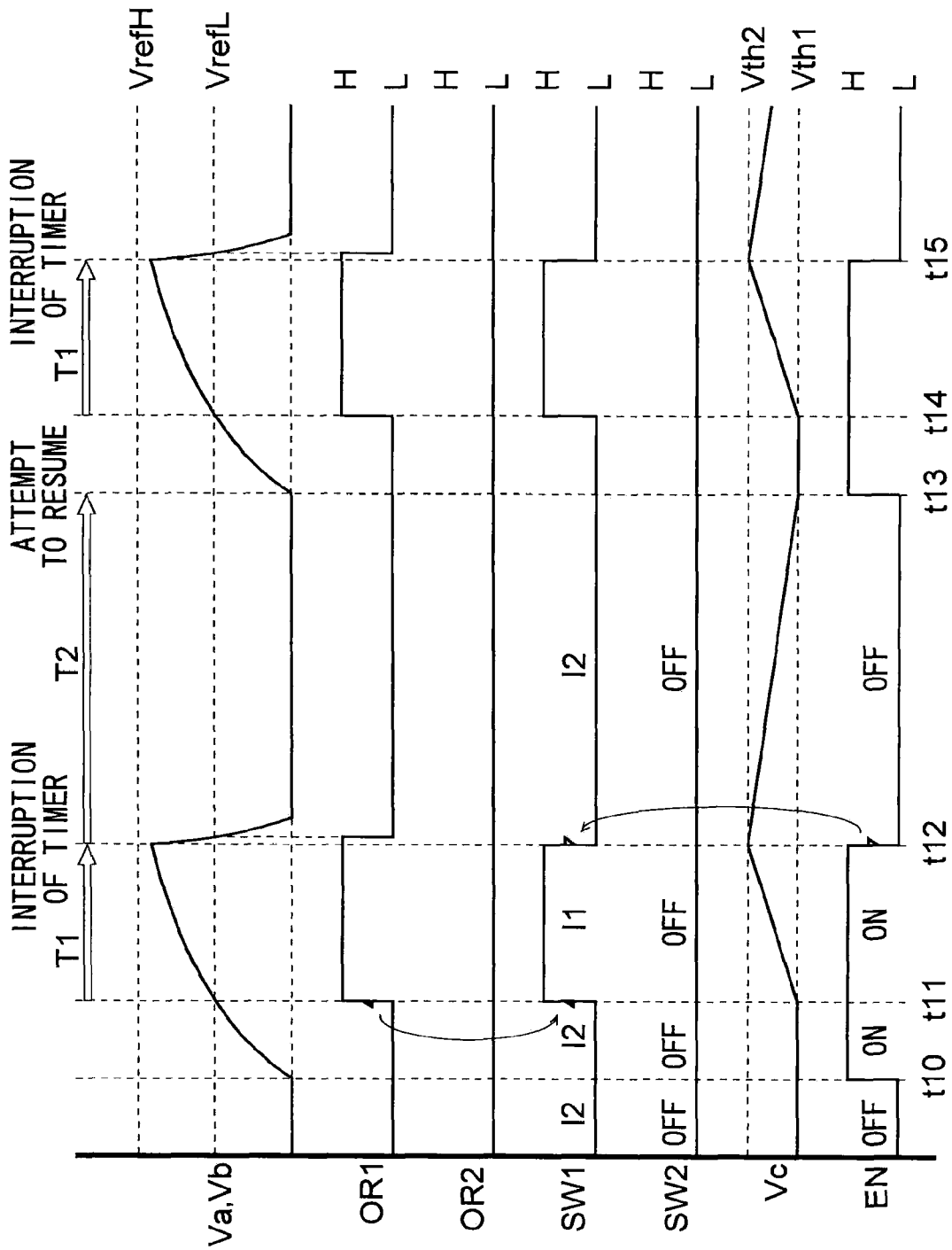
FIG. 3 A waveform diagram showing an example of operation of the timer circuit TMR.
Figure 4:
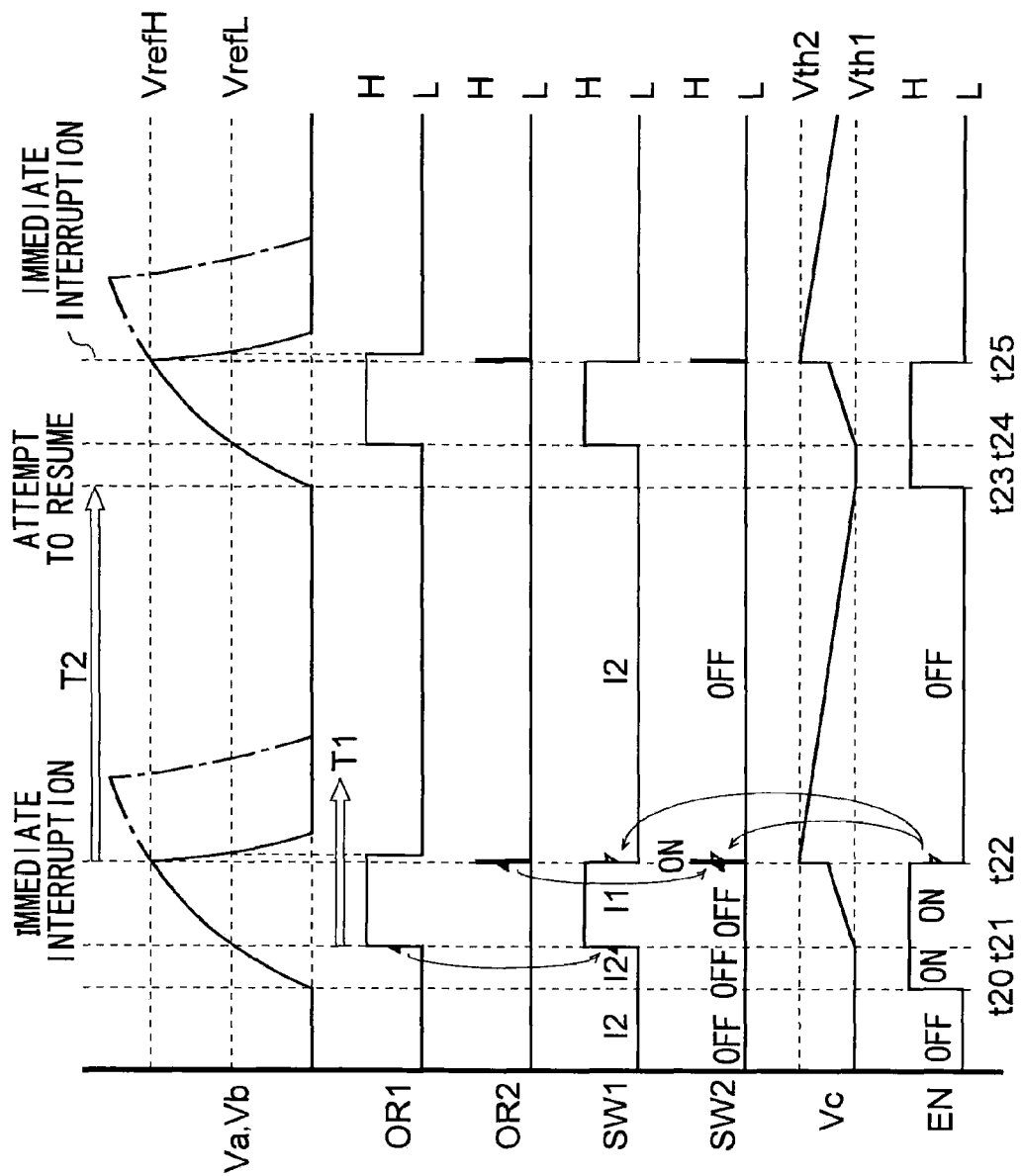
FIG. 4 A waveform diagram showing an example of operation of the timer circuit TMR.

FIGS. 3 and 4 are both waveform diagrams showing an example of operation of the timer circuit TMR. In these figures, reference characters "Va, Vb" and "Vc" on the far left indicate the voltage waveforms of the detection voltages Va and Vb and the charging voltage Vc, and reference characters "OR1", "OR2", and "EN" indicate the logic states of the first and second OR signals and the overcurrent protection signal EN. Reference character "SW1" indicates a switching state of the first switch SW1, and reference character "SW2" indicates an opening/closing state of the second switch SW2.

First, a case shown in FIG. 3 (in which one of the detection voltages Va and Vb has reached the first threshold voltage VrefL, but has not reached the second threshold voltage VrefH) will be described.

At time t10, the motor driving device 2 is started. When one of the detection voltages Va and Vb has reached the first threshold voltage VrefL at time t11, the first OR signal is turned to a high level, and the first switch SW1 connects the common terminal thereof to the first switch terminal. As a result, the capacitor C1 is charged by the first constant-current source I1, and the charging voltage Vc starts to increase.

The constant current (charging current) generated by the first constant-current source I1 is adjusted to a current value at which it takes a first threshold time T1 (for example, 10 [µs]) to increase the charging voltage Vc of the capacitor C1 from the lower-limit set voltage Vth1 to the upper-limit set voltage Vth2. That is, when the capacitor C1 starts to be charged, the first threshold time T1 starts to be counted.

After time t11, when the first threshold time T1 has elapsed with the detection voltages Va and Vb kept above the first threshold voltage VrefL and the charging voltage Vc has reached the upper-limit set voltage Vth2 at time t12, the comparison output signal of the fourth comparator CMP4 is turned to a high level, the RS flip-flop FF is reset, and the overcurrent protection signal EN is changed to a disabled state (a low level). As a result, in the control circuit 22, opening/closing control of the transistors that form the H-bridge circuit 21 is prohibited, and the driving of the motor 1 is stopped. This causes a rapid decrease in the detection voltages Va and Vb, turning the first OR signal to a low level.

Here, the first switch SW1 connects the common terminal thereof to the second switch terminal when the overcurrent protection signal EN is changed to a disabled state before the first OR signal is turned to a low level. As a result, the capacitor C1 is discharged by the second constant-current source I2, and the charging voltage Vc starts to decrease.

The constant current (discharging current) generated by the second constant-current source I2 is adjusted to a current value at which it takes a second threshold time T2 (for example, 290 [µs]) to decrease the charging voltage Vc of the capacitor C1 from the upper-limit set voltage Vth2 to the lower-limit set voltage Vth1. That is, when the capacitor C1 starts to be discharged, the second threshold time T2 starts to be counted.

After time t12, when the second threshold time T2 has elapsed and the charging voltage Vc has reached the lower-limit set voltage Vth1 at time t13, the comparison output signal of the third comparator CMP3 is turned to a high level, the RS flip-flop FF is set, and the overcurrent protection signal EN is returned to an enabled state (a high level). As a result, in the control circuit 22, opening/closing control of the transistors that form the H-bridge circuit 21 is permitted again, and an attempt is made to resume the driving of the motor 1.

At time t13, the motor driving device 2 is re-started. Thereafter, the overcurrent protection operation is repeated in the same manner as described above.

That is, when one of the detection voltages Va and Vb has reached the first threshold voltage VrefL at time t14, the first threshold time T1 starts to be counted again. When the counting of the first threshold time T1 is completed at time t15, the overcurrent protection signal EN is changed to a disabled state, and the driving of the motor 1 is stopped again.

As mentioned earlier, FIG. 3 shows a case in which one of the detection voltages Va and Vb has reached the first threshold voltage VrefL, but has not reached the second threshold voltage VrefH. Thus, the second OR signal is never turned to a high level, and accordingly the second switch SW2 is never switched to an on state.

Next, a case shown in FIG. 4 (in which one of the detection voltages Va and Vb has also reached the second threshold voltage VrefH) will be described.

At time t20, the motor driving device 2 is started. When one of the detection voltages Va and Vb has reached the first threshold voltage VrefL at time t21, the first OR signal is turned to a high level, and the first switch SW1 connects the common terminal thereof to the first switch terminal. As a result, the capacitor C1 is charged by the first constant-current source I1, and the charging voltage Vc starts to increase (that is, the first threshold time T1 starts to be counted).

On the other hand, after the first threshold time T1 starts to be counted, when one of the detection voltages Va and Vb has reached the second threshold voltage VrefH at time t22, the second OR signal is turned to a high level, and the second switch SW2 is switched to an on state. As a result, the capacitor C1 is short-circuited to the power supply line and is then rapidly charged, sharply increasing the charging voltage Vc to the upper-limit set voltage Vth2. As described above, when the charging voltage Vc has reached the upper-limit set voltage Vth2, the comparison output signal of the fourth comparator CMP4 is turned to a high level, the RS flip-flop FF is reset, and the overcurrent protection signal EN is changed to a disabled state (a low level). As a result, in the control circuit 22, opening/closing control of the transistors that form the H-bridge circuit 21 is prohibited, and the driving of the motor 1 is stopped. This causes a rapid decrease in the detection voltages Va and Vb, turning both of the first and second OR signals to a low level.

Here, the first switch SW1 connects the common terminal thereof to the second switch terminal when the overcurrent protection signal EN is changed to a disabled state before the first OR signal is turned to a low level, and the second switch SW2 is switched to an off state when the overcurrent protection signal EN is changed to a disabled state before the second OR signal is turned to a low level. As a result, the capacitor C1 is discharged by the second constant-current source I2, and the charging voltage Vc starts to decrease (that is, the second threshold time T2 starts to be counted).

After time t22, when the second threshold time T2 has elapsed and the charging voltage Vc has reached the lower-limit set voltage Vth1 at time t23, the comparison output signal of the third comparator CMP3 is turned to a high level, the RS flip-flop FF is set, and the overcurrent protection signal EN is returned to an enabled state (a high level). As a result, in the control circuit 22, opening/closing control of the transistors that form the H-bridge circuit 21 is permitted again, and an attempt is made to resume the driving of the motor 1.

At time t23, the motor driving device 2 is re-started. Thereafter, the overcurrent protection operation is repeated in the same manner as described above.

That is, when one of the detection voltages Va and Vb has reached the first threshold voltage VrefL at time t24, the first threshold time T1 starts to be counted again. When one of the detection voltages Va and Vb has also reached the second threshold voltage VrefH at time t25, the counting of the first threshold time T1 is forcibly stopped without waiting for the first threshold time T1 to elapse, the overcurrent protection signal EN is changed to a disabled state, and the driving of the motor 1 is stopped again.

As described above, in the overcurrent protection circuit 23 of this embodiment, the timer circuit TMR is configured as follows. When one of the detection voltages Va and Vb has reached the first threshold voltage VrefL, the timer circuit TMR starts to count the first threshold time T1. When the first threshold time T1 has elapsed with the detection voltages Va and Vb kept above the first threshold voltage VrefL, the timer circuit TMR changes the overcurrent protection signal EN to a disabled state and starts to count the second threshold time T2. When the second threshold time T2 has elapsed, the timer circuit TMR returns the overcurrent protection signal EN to an enabled state. On the other hand, after one of the detection voltages Va and Vb has reached the first threshold voltage VrefL and the first threshold time T1 starts to be counted, when one of the detection voltages Va and Vb has reached the second threshold voltage VrefH, the timer circuit TMR forcibly stops the counting of the first threshold time T1 without waiting for the first threshold time T1 to elapse, changes the overcurrent protection signal EN to a disabled state, and starts to count the second threshold time T2.

With this configuration, when the drive currents ia and ib to be monitored become too great, such as when the impedance component of the motor coil L is small or an output terminal connected to the motor coil L and a power supply voltage or a ground are short-circuited, it is possible to immediately shut down the driving of the motor 1 without waiting for the first threshold time T1 set for noise masking to elapse.

Thus, with the overcurrent protection circuit 23 of this embodiment, it is possible to effectively reduce the risk of the object to be protected being broken as a result of exceeding its safe operating area due to the excessive drive currents ia and ib continuously flowing therethrough until the first threshold time T1 has elapsed (see dashed line in FIG. 4 for reference characters "Va" and "Vb").

Moreover, the overcurrent protection circuit 23 of this embodiment has an advantage that instantaneous noise or the like rarely causes it to malfunction because it is so configured that, unless the detection voltages Va and Vb have reached the second threshold voltage VrefH, the driving of the motor 1 is shut down after the first threshold time T1 has elapsed.

Furthermore, the overcurrent protection circuit 23 of this embodiment eliminates the need to provide a CPU and a memory for realizing overcurrent protection operation. This advantageously helps minimize the increase in the device size and in its cost.

With the overcurrent protection circuit 23 of this embodiment, even after the driving of the motor 1 is shut down, it is possible to make an attempt to resume the driving thereof after waiting for the second threshold time T2 to elapse. Thus, if the cause of an overcurrent is eliminated, it is possible to restore normal operation to the motor driving device 2 without performing restoration work of any kind.

As described above, according to the present invention, it is possible to determine the urgency of the need for protection operation according to a current value of an object to be monitored, and to offer necessary and sufficient protection for the object to be protected based on the determination result.

Next, operation mode switching control performed by the control circuit 22 will be described in detail with reference to FIGS. 5 and 6.

Figure 6:
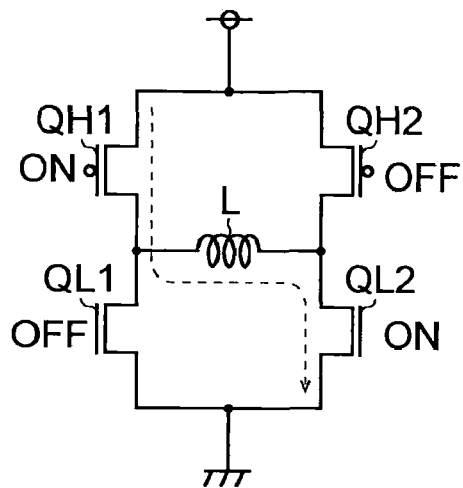
FIG. 6 Diagrams illustrating the drive current paths in the respective operation modes (forward rotation, reverse rotation, braking, idle running).
Figure 6:
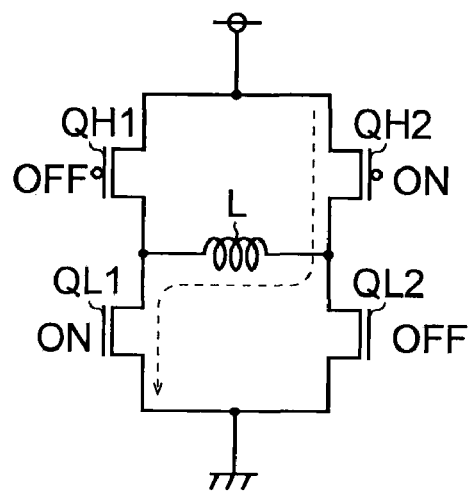
Figure 6:
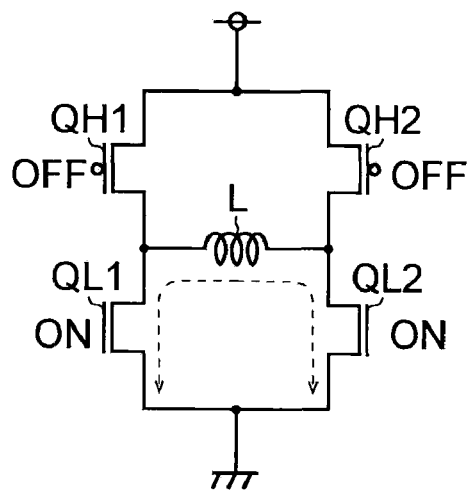
Figure 6:
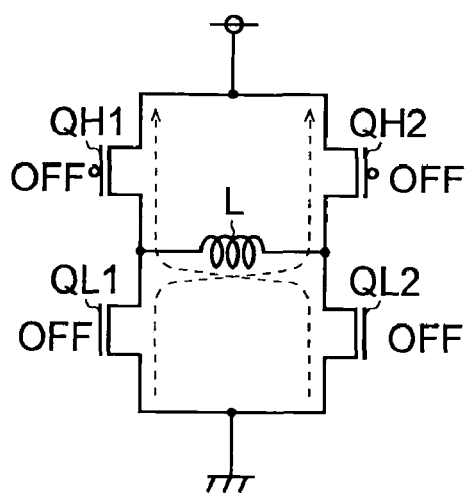

FIG. 5 is a diagram illustrating gate signal generating operation performed according to the operation mode control signals FIN and RIN, and FIG. 6 are diagrams illustrating the drive current paths in the respective operation modes (forward rotation, reverse rotation, braking, idle running).

In FIG. 5, reference characters "FIN" and "RIN" on the far left indicate the logic states of the operation mode control signals FIN and RIN inputted from the outside of the device, and reference characters "QH1", "QH2", "QL1", and "QL2" indicate the logic states of the gate signals of the transistors QH1, QH2, QL1, and QL2 that form the H-bridge circuit 21. Reference character "mode" indicates an operation mode of the motor 1.

When the operation mode control signals FIN and RIN take a high level and a low level, respectively, the control circuit 22 generates the gate signals that turn the transistors QH1 and QL2 on and turn the transistors QH2 and QL1 off so as to put the motor 1 into "forward rotation mode". As a result of the generation of these gate signals, a drive current is passed through the motor coil L that forms the motor 1 via the H-bridge circuit 21 along a path shown in FIG. 6(a), and the motor 1 is driven in the forward direction.

On the other hand, when the operation mode control signals FIN and RIN take a low level and a high level, respectively, the control circuit 22 generates the gate signals that turn the transistors QH2 and QL1 on and turn the transistors QH1 and QL2 off so as to put the motor 1 into "reverse rotation mode". As a result of the generation of these gate signals, a drive current is passed through the motor coil L that forms the motor 1 via the H-bridge circuit 21 along a path shown in FIG. 6(b), and the motor 1 is driven in the reverse direction.

When the operation mode control signals FIN and RIN both take a high level, the control circuit 22 generates the gate signals that turn the transistors QL1 and QL2 on and turn the transistors QH1 and QH2 off so as to put the motor 1 into "braking mode". As a result of the generation of these gate signals, a drive current is diverted away from the motor coil L that forms the motor 1 and flows into the ground terminal via the H-bridge circuit 21 along a path shown in FIG. 6(c), and the motor 1 is braked.

When the operation mode control signals FIN and RIN both take a low level, the control circuit 22 generates the gate signals that turn the transistors QH1, QH2 QL1, and QL2 off so as to put the motor 1 into "idle running mode". As a result of the generation of these gate signals, a current flows through the H-bridge circuit 21 along a path shown in FIG. 6 (d) according to the back electromotive force of the motor coil L that forms the motor 1, and the motor 1 is made to run idle.

As described above, in the motor driving device of this embodiment, as a result of a field-effect transistor being used as a switch element of the H-bridge circuit 21, it is possible to achieve higher responsivity to on/off control than when a bipolar transistor is used as a switch element. However, even when a bipolar transistor is used as a switch element, it is possible to achieve the effects of the present invention described above. Therefore, a field-effect transistor does not necessarily have to be used.

The embodiment described above deals with a configuration in which a single-phase DC motor is driven. However, the present invention is not limited to this specific configuration, but can be used in various motor driving devices that drive motors of any other type (voice coil motors, stepping motors, or the like).

Moreover, the present invention can be applied not only to motor driving devices but also to load driving devices that drive loads of any other type (in particular, inductance loads) in general.

Figure 7:
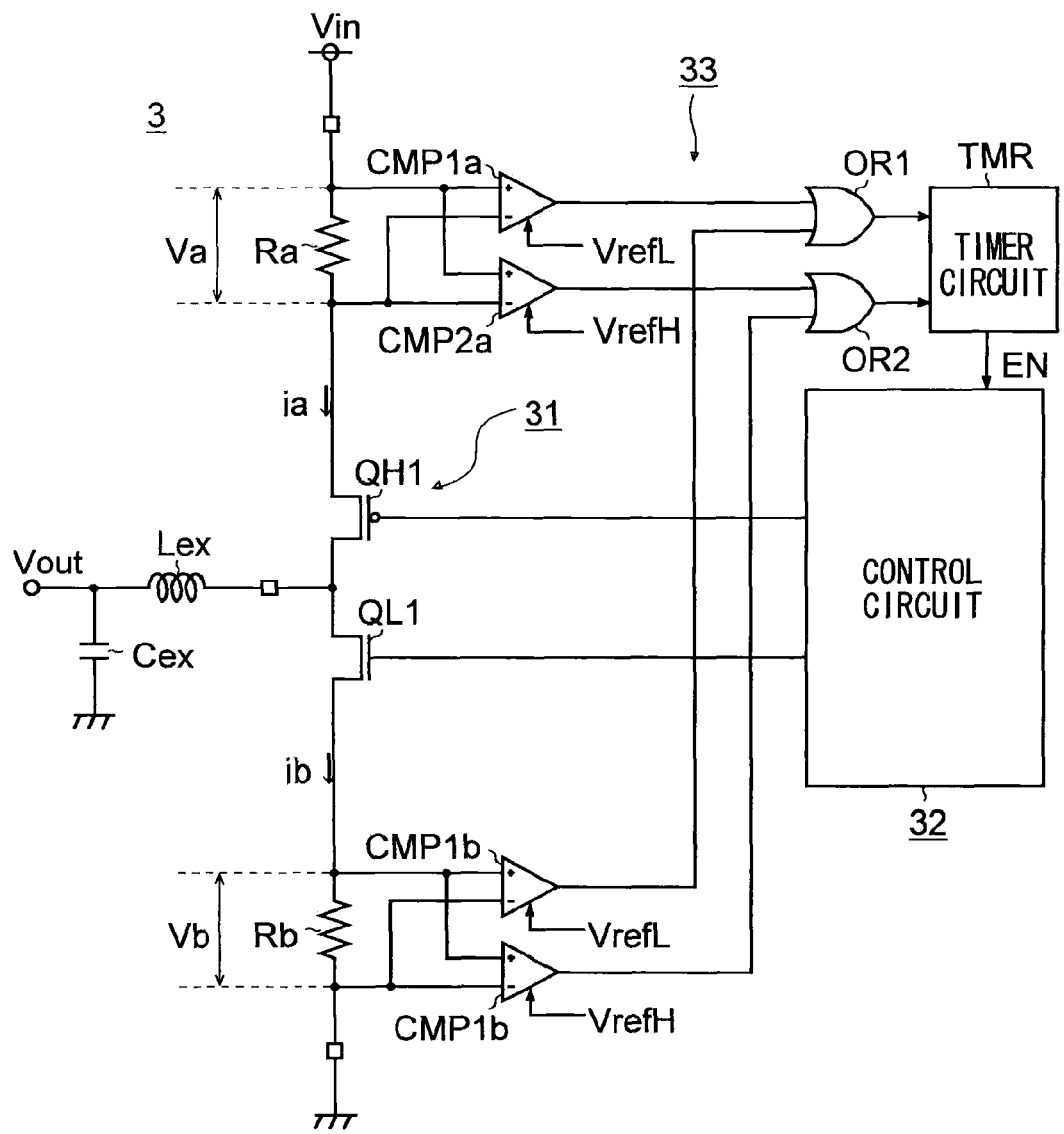
FIG. 7 A block diagram showing one embodiment of the power supply device of the present invention.

As shown in FIG. 7, the present invention can be applied as overcurrent preventing means of power supply devices. A power supply device shown in FIG. 7 is composed of an output circuit 31 that is built with output switch elements QH1 and QL1 connected between input and output terminals, a control circuit 32 that drives, according to opening/closing control of the output switch elements QH1 and QL1, an LC filter (a coil Lex and a capacitor Cex) connected to a node at which the switch elements are connected together and that generates a desired output voltage Vout from an input voltage Vin, and an overcurrent protection circuit 33 (having a configuration similar to that of the overcurrent protection circuit 23 described above) that generates an overcurrent protection signal EN by monitoring currents ia and ib flowing through the output switch elements QH1 and QL1. The control circuit 32 is so configured that opening/closing control of the output switch elements QH1 and QL1 is prohibited when the overcurrent protection signal EN is in a disabled state.

Obviously, many modifications and variations of the present invention are possible in light of the above teachings. It is therefore to be understood that within the scope of the appended claims, the invention may be practiced other than as specifically described.

For example, the embodiment described above deals with a case in which a charging/discharging circuit of the capacitor C1 is used as a means for counting the first and second threshold times T1 and T2. However, the present invention is not limited to this specific configuration, but may be so configured that the counting thereof is performed by using a counter or the like.

The embodiment described above deals with a configuration, as a means for switching charging/discharging of the capacitor C1, in which connection between the first and second constant-current sources I1 and I2 and the capacitor C1 is selectively switched by the first switch SW1. However, the present invention is not limited to this specific configuration, but may be so configured that the first and second constant-current sources I1 and I2 themselves are selectively switched between an operable state and an inoperable state.

The embodiment described above deals with a configuration in which switching control of the first and second switches SW1 and SW2 is performed when the overcurrent protection signal EN is changed to a disabled state before the first and second OR signals are turned to a low level. However, the present invention is not limited to this specific configuration. In a case where priority is given to simplification of the circuit configuration, the present invention may be so configured that switching control of the first and second switches SW1 and SW2 is performed according only to the first and second OR signals. However, since the first and second OR signals are turned to a low level slightly after the overcurrent protection signal EN is changed to a disabled state, from the viewpoint of starting the counting of the second threshold time T2 without delay, it is preferable to adopt the configuration described in the embodiment described above.

INDUSTRIAL APPLICABILITY

The present invention is useful in making load driving devices, such as motor driving devices, and power supply devices safer against an overcurrent. In particular, the present invention is suitable to applications (for example, on-vehicle devices) that require high reliability.

What is claimed is:

1. An overcurrent protection circuit comprising:
   a sense resistor to generate a detection voltage corresponding to a current flowing through an object to be protected;
   a first comparator to compare the detection voltage with a first threshold voltage;
   a second comparator to compare the same detection voltage that is compared by the first comparator with a second threshold voltage that is higher than the first threshold voltage; and
   a timer circuit to generate an overcurrent protection signal according to comparison output signals of the first and second comparators, wherein the timer circuit is operable to:
      start to count a first threshold time when the detection voltage has reached the first threshold voltage,
      when the first threshold time has elapsed with the detection voltage kept above the first threshold voltage, change the overcurrent protection signal to a disabled state and start to count a second threshold time,
      when the second threshold time has elapsed, return the overcurrent protection signal to an enabled state, and
      after the detection voltage has reached the first threshold voltage and the first threshold time starts to be counted, when the detection voltage has reached the second threshold voltage, forcibly change the overcurrent protection signal to a disabled state without waiting for the first threshold time to elapse, and start to count the second threshold time.

2. The overcurrent protection circuit of claim 1, wherein the timer circuit includes:
   a capacitor having one end from which a charging voltage is extracted,
   a first constant-current source to charge the capacitor,
   a second constant-current source to discharge the capacitor,
   a first switch to switch charging/discharging of the capacitor according to the comparison output signal of the first comparator and the overcurrent protection signal,
   a second switch to connect/disconnect the one end of the capacitor to/from a power supply line according to the comparison output signal of the second comparator and the overcurrent protection signal,
   a third comparator whose output logic is changed depending on whether the charging voltage is higher or lower than a predetermined lower-limit set voltage,
   a fourth comparator whose output logic is changed depending on whether the charging voltage is higher or lower than a predetermined upper-limit set voltage, and
   an RS flip-flop to receive comparison output signals of the third and fourth comparators, and from which an output signal thereof is extracted as the overcurrent protection signal, wherein the overcurrent protection circuit is operable so that the first switch is controlled to charge the capacitor by the first constant-current source when the detection voltage has reached the first threshold voltage, and discharge the capacitor by the second constant-current source when the detection voltage has not reached the first threshold voltage or the overcurrent protection signal is changed to a disabled state, and the second switch is controlled to connect the one end of the capacitor to the power supply line when the detection voltage has reached the second threshold voltage, and disconnect the one end of the capacitor from the power supply line when the detection voltage has not reached the second threshold voltage or the overcurrent protection signal is changed to a disabled state.

3. The overcurrent protection circuit of claim 1, wherein more than one group of the sense resistor and the first and second comparators is on a current path of the object to be protected.

4. A load driving device comprising:

an output circuit having an output switch element connected to a load;

a control circuit to feed a drive current to the load according to opening/closing control of the output switch element; and an overcurrent protection circuit according to claim 1 to generate an overcurrent protection signal by monitoring the drive current, wherein the control circuit is configured so that the opening/closing control of the output switch element is prohibited when the overcurrent protection signal is in a disabled state.

5. A motor driving device to control driving of a motor having a motor coil, the motor driving device comprising:

a load driving device according to claim 4 to feed a drive current to the motor coil.

6. An electric appliance comprising:

a motor; and a motor driving device according to claim 5 to control driving of the motor.

7. A power supply device, comprising:

an output circuit having an output switch element connected between input and output terminals;

a control circuit to generate a desired output voltage from an input voltage according to opening/closing control of the output switch element; and an overcurrent protection circuit according to claim 1 to generate an overcurrent protection signal by monitoring a current flowing through the output switch element, wherein the control circuit is configured so that the opening/closing control of the output switch element is prohibited when the overcurrent protection signal is in a disabled state.

* * * * *